E J. SMITH.
Gridiron.
No. 61,478.
Patented Jan. 22, 1867.
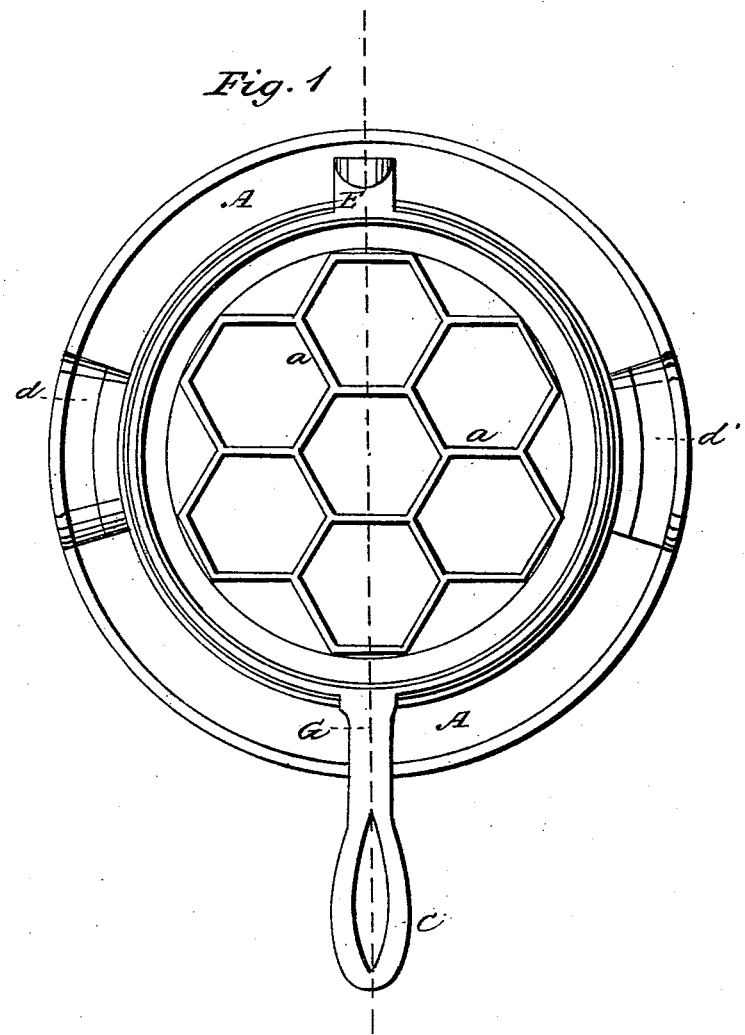
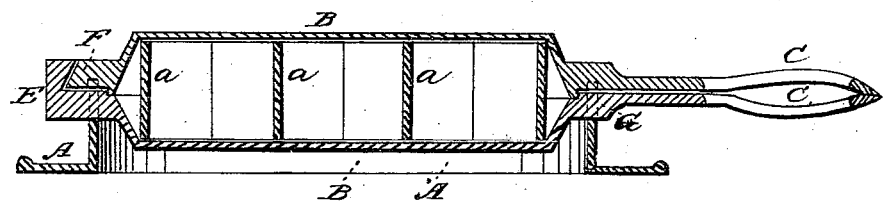

United States Patent Office.

E. J. SMITH, OF WASHINGTON, DISTRICT OF COLUMBIA.

Letters Patent No. 61,478, dated January 22, 1867; antedated January 10, 1867.

GRIDDLE OR COOKING UTENSIL.

*The Schedule referred to in these Letters Patent and making part of the same.*

TO ALL WHOM IT MAY CONCERN:

Be it known that I, E. J. SMITH, of Washington, in the District of Columbia, have invented a new and useful Cooking Utensil. I do hereby declare that the following is a full, clear, and exact description thereof, reference being had to the accompanying drawings, making a part of this specification, in which—

Figure 1 is the internal view of my improved cooking utensil with top plate removed, c, as represented, with moulds or nests ready for use.

Figure 2 is vertical central section thereof, with plates, B, in proper position, and nests or moulds in place.

My invention consists in an improved cooking utensil, hereinafter described, as a new article of manufacture, the same being adapted to several uses, such as the baking of corn cakes, cooking eggs, &c., by using the nests or moulds in their place, as shown in fig. 1, of uniform size and shape, and on both sides; also by removing the nests or moulds for a coffee roaster, or cooking steak, &c.

To enable others skilled in the art to make and use my invention, I will proceed to describe the same with reference to the accompanying drawings.

A is a conic or flaring ring, to be placed over stove-hole to support the apparatus, cast with projections, d d, serving as handle for lifting off stove. In upper edge of rim are two notches with rounded bottoms, which are diametrically opposite each other, which are supports to the other part of the apparatus. B B' are two circular plates, with concave circular depressions in their faces, within which are bottomless nests or moulds, indicated by letters a a, fitting closely into the chambers made to receive them, between the plates B B', closing them snugly together, so that the cakes when baking come in direct contact with these plates. The nests or moulds can, when the plates are opened, be removed at pleasure, to remove the cakes when baked, or for greasing. Each plate, on its outer surface, opposite the handle, is furnished with finger-piece, E, as represented, which projection on lower plate, forming an acute angle, and extending beyond that of the upper plate F, as represented, and projecting outwardly, forming an acute angle, in which the finger-piece of top plate F, whose points converge correspondingly, is made to fit, and, when together, form a circular projection, which, with root of handle, G, serve as pivots, on which the plates, when together, revolve, supported as before mentioned. The handles c c form in themselves a handle for the two plates when together, which when grasped serve as a lever, firmly keeping the plates in place when removing from frame or support.

From the foregoing description will be seen the articles can be cooked on on one side, then inverted on the other, and corn cakes after being baked can be taken out together by lifting out the nests or moulds, when they can be removed from their cells by inserting a knife in between the cake and side of nests or moulds, and removing them from the larger end of the moulds. It will be readily seen that the plates B B', when the moulds are removed, may be used separately for various purposes, as spider, or for roasting coffee, &c., &c. The cooking utensil herein described is adapted, by means of its legs or feet, to fit the holes in the range or stove, and is supported by the metal when revolving in the said holes, as will be evident.

I am aware it is not new to make kitchen utensils with cavity formed by two hollow plates, to bake waffles, to revolve on frame or supports, therefore I make no claim to such single plate or utensil. I am not aware, however, that a cooking utensil which is constructed as I have shown, and adapted to the several uses as set forth, has ever been manufactured or known; and therefore what I claim as my invention, and desire to secure by Letters Patent, is—

I claim as a new article of manufacture the cooking utensil herein described, composed of the plates B B', removable nests a a, and support A, substantially as and for the purpose set forth.

E. J. SMITH.

Witnesses:
EDM. F. BROWN,
N. N. WALTON.